(12) United States Patent
Baeder et al.

(10) Patent No.: US 12,047,159 B2
(45) Date of Patent: Jul. 23, 2024

(54) INTERFERENCE CANCELLATION FOR SATELLITE COMMUNICATION

(71) Applicant: Rohde & Schwarz GmbH & Co. KG, Munich (DE)

(72) Inventors: Uwe Baeder, Erding (DE); Steffen Bittner, Dresden (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 8 days.

(21) Appl. No.: 17/952,998

(22) Filed: Sep. 26, 2022

(65) Prior Publication Data

US 2023/0138550 A1    May 4, 2023

(30) Foreign Application Priority Data

Oct. 29, 2021 (EP) ...................................... 21205598

(51) Int. Cl.
*H04B 7/185* (2006.01)
(52) U.S. Cl.
CPC ................................ *H04B 7/18513* (2013.01)
(58) Field of Classification Search
CPC ........................ H04B 7/18513; H04B 7/18563
See application file for complete search history.

(56) References Cited

U.S. PATENT DOCUMENTS

| | | | |
|---|---|---|---|
| 5,860,057 A | 1/1999 | Ishida et al. | |
| 7,039,400 B2 | 5/2006 | Karabinis et al. | |
| 7,813,700 B2 * | 10/2010 | Zheng | H04B 7/18513 455/12.1 |
| 9,215,019 B2 | 12/2015 | Jiang et al. | |
| 2012/0295538 A1 * | 11/2012 | Arcidiacono | H04B 7/185 455/12.1 |
| 2014/0079168 A1 * | 3/2014 | Petrovic | H04B 1/10 375/350 |
| 2020/0404507 A1 * | 12/2020 | Bull | H04W 16/14 |
| 2021/0211149 A1 | 7/2021 | Singh et al. | |
| 2021/0211188 A1 * | 7/2021 | Hamet | H04B 7/0456 |
| 2022/0046517 A1 * | 2/2022 | Dang | H04W 48/04 |

OTHER PUBLICATIONS

European Search Report for related European Patent Application No. 21205598.2-1206, dated Apr. 7, 2022, 12 pages.
Linling et al., "Radio Resource Management in Future Terrestrial-Satellite Communication Networks", IEEE Wireless Communications, Coordinated Science Laboratory; Dept. Electrical and Computer Engineering, vol. 24, No. 5, pp. 81-87.

* cited by examiner

*Primary Examiner* — Dac V Ha
(74) *Attorney, Agent, or Firm* — DITTHAVONG, STEINER, & MLOTKOWSKI

(57) ABSTRACT

Disclosed are a system and a method for digital radio interference mitigation. The system includes a first interface configured to receive a first digital signal associated with a satellite ground station; a second interface configured to receive a second digital signal associated with and acquired at a radio network transceiver; and a signal processing unit connected to the first and second interfaces and configured to mitigate a radio interference associated with the second digital signal in the first digital signal. This may improve a reception of satellite ground stations, especially upon coexistence with 5G cellular services in the C-band frequency spectrum.

13 Claims, 2 Drawing Sheets

INTERFERENCE CANCELLATION FOR SATELLITE COMMUNICATION

TECHNICAL FIELD

The present disclosure relates to satellite communication, and in particular, to corresponding systems and methods for digital radio interference mitigation.

BACKGROUND ART

Starting with fifth-generation (5G) cellular services, a deployment of a C-Band frequency spectrum (3.4-4.2 GHz) has commenced which is has traditionally been used by satellite services including Fixed Satellite Service (FSS).

Therefore, satellite ground reception nowadays may be subject to radio interference from terrestrial radio network transceivers, such as cellular base stations.

SUMMARY

In view of the above-mentioned drawback, an objective of the present disclosure is to improve a reception of satellite ground stations of the background art.

The objective is achieved by the embodiments as defined by the appended independent claims. Preferred embodiments are set forth in the dependent claims and in the following description and drawings.

A first aspect of the present disclosure relates to a system for digital radio interference mitigation, comprising a first interface configured to receive a first digital signal associated with a satellite ground station; a second interface configured to receive a second digital signal associated with and acquired at a radio network transceiver; and a signal processing unit connected to the first and second interfaces and configured to mitigate a radio interference associated with the second digital signal in the first digital signal.

The first digital signal may comprise a downlink (DL) baseband signal demodulated by the satellite ground station.

The first digital signal may comprise a digital I/Q over IP signal.

The second digital signal may comprise a DL baseband signal and/or an uplink (UL) baseband signal associated with the radio network transceiver.

The second digital signal may comprise a digital I/Q over IP signal.

The second digital signal may be demodulated by the radio network transceiver.

The system may further comprise a radio probe connectable to the second interface and configured to demodulate the second digital signal from a radio signal acquired within a given distance to the radio network transceiver.

The second digital signal may further comprise an information indicative of a beam direction of the radio network transceiver relative to the satellite ground station.

The second digital signal may further comprise an information indicative of a channel state between the radio network transceiver and the satellite ground station.

The information indicative of the channel state may comprise a channel matrix estimated by the radio network transceiver.

The signal processing unit may be configured to mitigate the radio interference associated with the second digital signal in the first digital signal using an adaptive filter.

The signal processing unit may further be configured to estimate coefficients of the adaptive filter using one or more of: a least mean squares, LMS, algorithm; a normalized least mean squares, NLMS, algorithm; a recursive least squares, RLS, algorithm; a multiple signal classification, MUSIC, algorithm; and machine learning.

The machine learning may comprise supervised training of an artificial neural network.

The radio network transceiver may use radio frequencies allocated to a DL of fixed satellite services, FSS.

A second aspect of the present disclosure relates to a method for digital radio interference mitigation, comprising: receiving a first digital signal associated with a satellite ground station; receiving a second digital signal associated with and acquired at a radio network transceiver; and mitigating a radio interference associated with the second digital signal in the first digital signal.

ADVANTAGEOUS EFFECTS

The present disclosure provides systems and for digital radio interference mitigation which may improve a reception of satellite ground stations in coexistence scenarios with 5G cellular radio, by acquiring the interfering digital signal at the interfering radio network transceiver (i.e. cellular base station).

Acquisition of an interfering digital baseband signal re-uses an available digital signal and does not create additional computing effort at the interfering radio network transceiver.

Acquisition of an interfering digital I/Q over IP signal re-uses available signal processing algorithms and communication protocols.

A radio probe configured to demodulate the second digital signal from a radio signal acquired within a given distance to the radio network transceiver provides the interfering digital signal if no direct interface to the interfering radio network transceiver is available or wanted.

Including an information indicative of a beam direction of the radio network transceiver relative to the satellite ground station and/or an information indicative of a channel state between the radio network transceiver and the satellite ground station may respectively improve an effectivity of interference cancellation.

Mitigation of radio interference using adaptive filters facilitates re-use of available signal processing algorithms, such as LMS, NLMS, RLS and/or MUSIC, and further allows for estimation of coefficients by machine learning.

The proposed systems and methods are especially effective if the interfering radio network transceiver uses radio frequencies allocated to a DL of FSS, i.e., upon coexistence in the C-band frequency spectrum.

The technical effects and advantages described in relation with the system equally apply to the method having corresponding features.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
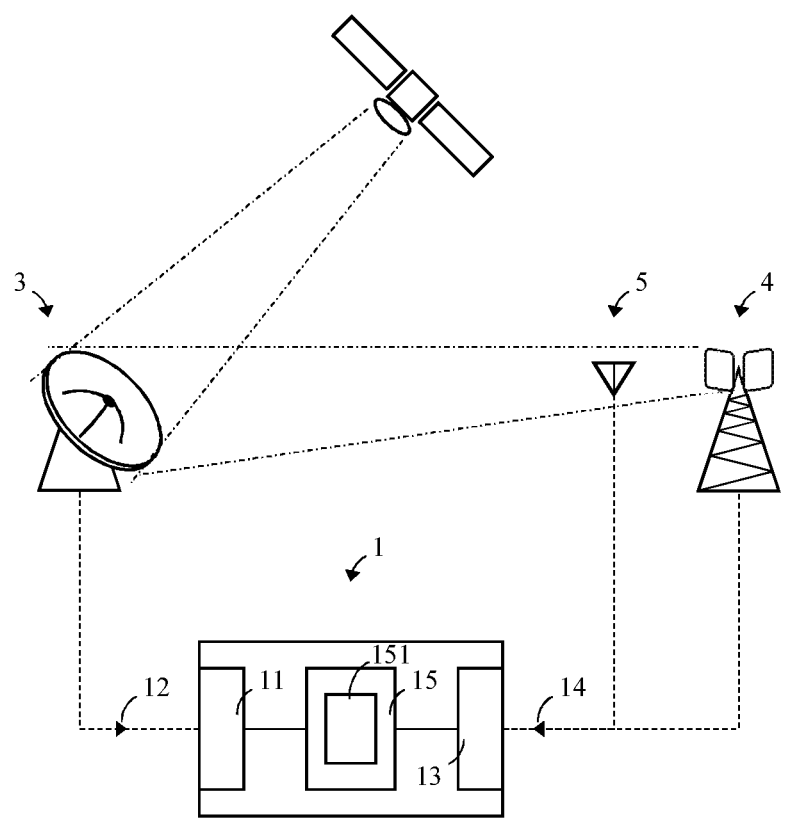

The drawings are to be regarded as being schematic representations, and elements illustrated in the drawings are not necessarily shown to scale. Rather, the various elements are represented such that their function and general purpose become apparent to those skilled in the art.

FIG. 1 illustrates a system in accordance with the present disclosure; and

Figure 2:
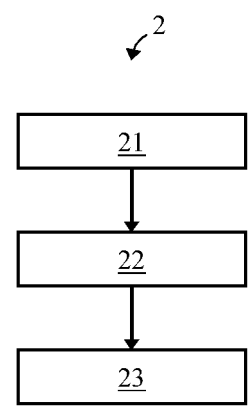

FIG. 2 illustrates a method in accordance with the present disclosure.

DETAILED DESCRIPTIONS OF DRAWINGS

FIG. 1 illustrates a system 1 in accordance with the present disclosure.

The system 1 is suitable for digital radio interference mitigation.

The system 1 comprises a first interface 11 configured to receive a first digital signal 12 associated with a satellite ground station 3. The first digital signal 12 may comprise a DL baseband signal demodulated by the satellite ground station 3. In particular, the first digital signal 12 may comprise a digital I/Q over IP signal.

The system 1 further comprises a second interface 13 configured to receive a second digital signal 14 associated with and acquired at a radio network transceiver 4. The radio network transceiver 4 may especially use radio frequencies allocated to a DL of FSS. The second digital signal 14 may comprise a DL baseband signal and/or an UL baseband signal associated with the radio network transceiver 4. Particularly, the second digital signal 14 may comprise a digital I/Q over IP signal.

The second digital signal 14 may be demodulated by the radio network transceiver 4. Alternatively or additionally (especially in case of a plurality of radio network transceivers 4), the system 1 may further comprise a radio probe 5 which is connectable to the second interface 13 and configured to demodulate the second digital signal 14 from a radio signal acquired within a given distance to the radio network transceiver 4. For example, the given distance may preferably amount to less than 100 meters, more preferably to less than 10 meters, and most preferably even closer (in immediate vicinity of the radio network transceiver 4). The second digital signal 14 provided by the radio probe 5 should ideally reproduce the second digital signal 14 provided by the radio network transceivers 4.

One implementation of the radio probe 5 may include a cellular radio receiver configured to demodulate the DL baseband signal of the radio network transceiver 4 from a radio signal, and/or determine an UL channel allocation of the radio network transceiver 4 and demodulate its UL baseband signal from a radio signal.

The second digital signal 14 may further comprise an information indicative of a beam direction of the radio network transceiver 4 relative to the satellite ground station 3, and/or an information indicative of a channel state between the radio network transceiver 4 and the satellite ground station 3, in particular a channel matrix estimated by the radio network transceiver 4. For example, a DL baseband signal associated with the radio network transceiver 4 and a channel matrix estimated by the radio network transceiver 4 may be transformed into the interfering DL signal at the satellite ground station 3. Likewise, an UL baseband signal associated with the radio network transceiver 4 and the channel matrix estimated by the radio network transceiver 4 may be transformed into the interfering UL signal at the satellite ground station 3. A priori knowledge of the beam direction of the radio network transceiver 4 may further improve these transformations.

The system 1 further comprises a signal processing unit 15 connected to the first and second interfaces 11, 13 and configured to mitigate a radio interference associated with the second digital signal 14 in the first digital signal 12, in particular using an adaptive filter 151.

The signal processing unit 15 may further be configured to estimate coefficients of the adaptive filter 151 using one or more of: a least mean squares, LMS, algorithm; a normalized least mean squares, NLMS, algorithm; a recursive least squares, RLS, algorithm (all of which being used for beamforming the radiation patterns of smart antennas); a multiple signal classification, MUSIC, algorithm (used for frequency estimation and radio direction finding); and machine learning. For example, the machine learning may comprise supervised training of an artificial neural network (ANN) based on inputs (at least portions of recorded first and second signals) and a desired output (filter coefficients known to achieve an improvement in digital signal quality of the recorded first signal, such as a bit error ratio (BER), for example).

FIG. 2 illustrates a method 2 in accordance with the present disclosure.

A second aspect of the present disclosure relates to a method 2 for digital radio interference mitigation, comprising: receiving 21 a first digital signal 12 associated with a satellite ground station 3; receiving 22 a second digital signal 14 associated with and acquired at a radio network transceiver 4; and mitigating 23 a radio interference associated with the second digital signal 14 in the first digital signal 12.

The invention claimed is:

1. A system for digital radio interference mitigation, comprising:
   a first interface configured to receive a first digital signal associated with a satellite ground station;
   a second interface configured to receive a second digital signal associated with and acquired at a radio network transceiver, the second digital signal comprising a downlink (DL) baseband signal and/or an uplink (UL) baseband signal associated with the radio network transceiver;
   a signal processing unit connected to the first and second interfaces and configured to mitigate a radio interference associated with the second digital signal in the first digital signal; and
   a radio probe connectable to the second interface and configured to demodulate the second digital signal from a radio signal acquired within a given distance to the radio network transceiver.

2. The system of claim 1, the first digital signal comprising a downlink (DL) baseband signal demodulated by the satellite ground station.

3. The system of claim 2, the first digital signal comprising a digital In-phase/Quadrature (I/Q) over Internet Protocol (IP) signal.

4. The system of claim 1, the second digital signal comprising a digital In-phase/Quadrature (I/Q) over IP signal.

5. The system of claim 1, the second digital signal being demodulated by the radio network transceiver.

6. The system of claim 1, the second digital signal further comprising an information indicative of a beam direction of the radio network transceiver relative to the satellite ground station.

7. The system of claim 1, the second digital signal further comprising an information indicative of a channel state between the radio network transceiver and the satellite ground station.

8. The system of claim 7, the information indicative of the channel state comprising a channel matrix estimated by the radio network transceiver.

9. The system of claim 1, the signal processing unit being configured to mitigate the radio interference associated with the second digital signal in the first digital signal using an adaptive filter.

10. The system of claim 9, the signal processing unit further being configured to estimate coefficients of the adaptive filter using one or more of:
- a least mean squares (LMS) algorithm;
- a normalized least mean squares (NLMS) algorithm;
- a recursive least squares (RLS) algorithm;
- a multiple signal classification (MUSIC) algorithm; and
- machine learning.

11. The system of claim 10, the machine learning comprising supervised training of an artificial neural network.

12. The system of claim 10, the radio network transceiver using radio frequencies allocated to a downlink (DL) of fixed satellite services (FSS).

13. A method for digital radio interference mitigation, comprising:
- receiving a first digital signal associated with a satellite ground station;
- receiving a second digital signal associated with and acquired at a radio network transceiver, the second digital signal comprising a downlink (DL) baseband signal and/or an uplink (UL) baseband signal associated with the radio network transceiver;
- mitigating a radio interference associated with the second digital signal in the first digital signal; and
- demodulating the second digital signal from a radio signal acquired within a given distance to the radio network transceiver.

* * * * *